United States Patent [19]
O'Hara, III et al.

[11] Patent Number: 6,022,635
[45] Date of Patent: Feb. 8, 2000

[54] ELECTROCHEMICAL CELL HAVING A MOISTURE BARRIER

[75] Inventors: Thomas J. O'Hara, III, Bay Village; Xi-Xian Wu, North Olmsted, both of Ohio

[73] Assignee: Eveready Battery Company, Inc., St. Louis, Mo.

[21] Appl. No.: 08/937,138

[22] Filed: Sep. 24, 1997

[51] Int. Cl.⁷ .............................. H01M 2/12; H01M 2/08
[52] U.S. Cl. ............................. 429/56; 429/53; 429/54; 429/171; 429/173; 429/174; 429/185
[58] Field of Search .................... 429/53, 54, 56, 429/171, 173, 174, 185

[56] References Cited

U.S. PATENT DOCUMENTS

| | | |
|---|---|---|
| 3,218,197 | 11/1965 | Carmichael et al. |
| 4,581,304 | 4/1986 | Beatty et al. ............................. 429/56 |
| 4,774,155 | 9/1988 | Nientiedt et al. |
| 4,931,368 | 6/1990 | Ayers et al. ............................... 429/53 |
| 5,173,379 | 12/1992 | Ichinose et al. ......................... 429/174 |
| 5,227,261 | 7/1993 | Georgopoulous ......................... 429/56 |
| 5,248,568 | 9/1993 | Getz .......................................... 429/56 |
| 5,272,020 | 12/1993 | Flack ....................................... 429/141 |

FOREIGN PATENT DOCUMENTS 8-17408    1/1996    Japan.

Primary Examiner—Maria Nuzzolillo
Assistant Examiner—Tracy Dove
Attorney, Agent, or Firm—Robert W. Welsh; Stewart A. Fraser

[57] ABSTRACT

An electrochemical cell according to the present invention includes a can having an open end; electrochemical materials including two electrodes provided inside the can; a seal provided in the open end of the can for preventing leakage of the electrochemical materials from the can; and a moisture barrier provided in the open end of the can for preventing external moisture from reaching the interior of the cell. Preferably, the ambient air barrier includes an inner cover or outer cover having at least one aperture. The ambient air barrier may further include a moisture-impervious plug material disposed in contact with the inner cover or outer cover for releasably sealing the aperture in the inner cover or outer cover. Alternatively, the moisture barrier may include a layer of moisture-impervious material disposed on the outer surface of the seal in an area exposed to ambient air passing at least partially through the aperture in the inner cover and/or outer cover.

26 Claims, 4 Drawing Sheets

ELECTROCHEMICAL CELL HAVING A MOISTURE BARRIER

BACKGROUND OF THE INVENTION

The present invention generally relates to an electrochemical cell. More particularly, the present invention relates to the mechanical construction of a battery.

Due to environmental concerns in recycling batteries, conventional alkaline batteries are now being manufactured without utilizing mercury. Although the elimination of mercury from an alkaline battery eliminates such environmental concerns, zero-mercury batteries tend to generate greater volumes of gas, which is primarily hydrogen, during the lifetime of the battery. This potential increase in gassing can cause several problems. First, sufficient space within the electrochemical cell must be provided for the accumulation of such gases. Because more space is required to accommodate the potential increased volume of generated gases in a zero-mercury battery, the amounts of active ingredients forming the anode and the cathode must be reduced. Such a reduction in active ingredients undesirably reduces the service life of the battery.

Another problem associated with the increased gassing in a zero-mercury battery is that the additional gases produced during discharge significantly increase the pressure inside the cell. To prevent the cells from bursting as a result of this increased pressure, pressure relief points are built in to the structure of the cell as a safeguard. An example of a conventional cell construction having such safeguards is described below with reference to FIG. 1.

As shown in FIG. 1, a conventional battery 10 includes a steel can 15 having an open end 16 and a closed end defined by a bottom surface 18. Battery 10 further includes a first electrode material 20 provided in electrical contact with the interior side surfaces and bottom surface 18 of can 15. A second electrode 25 is provided in the interior portion of battery 10 and is separated from first electrode 20 by a separator layer (not shown). After the electrode materials are inserted into can 15, a subassembly consisting of a seal 30 and a cover 40 is inserted into open end 16 of can 15. The inner cover 40, which is generally shaped as a disk having a central hole, is inserted such that its peripheral surface is in contact with an outer portion 31 of seal 30 and its surface defining the central hole is fitted around an inner hub portion 32 of seal 30.

As shown in FIG. 1, inner hub portion 32 of seal 30 includes a central hole 33 for receiving a current collector nail 45, which is driven through hole 33 thereby compressing the portions of seal 30 that are in contact with inner cover 40. After collector nail 45 is fully driven in place, a negative outer cover 50 is inserted in an open area defined by the outer portions 31 of seal 30. Negative cover 50 is provided in electrical contact with the head 46 of collector nail 45 while being electrically insulated from can 15 by seal 30. Once negative cover 50 is in place, the side walls of can 15 in the vicinity of opening 16 are crimped inwardly to secure negative cover 50 in place. A positive cover 60 is then welded to bottom surface 18 of can 15. Subsequently, a label 65, which may be formed of a shrinkable PVC material, is secured about the periphery of can 15.

As a safeguard against excessive internal pressure resulting from gas build-up, a pressure relief point 35 is provided in the lower portion of seal 30 by forming the seal with a relatively thin section that tears open when the internal cell pressure becomes excessive. To allow the gas to then vent to the outside of the battery, one or more vent holes 42 are provided through inner cover 40 and a plurality of vent holes 52 are provided in negative cover 50.

The primary functions of a seal are to prevent the materials inside the cell from leaking out while allowing hydrogen gas to pass through the seal and escape. By allowing the hydrogen gas to escape, the pressure level inside the cell is less likely to become excessive. Because the seals typically used in such alkaline batteries are made of a nylon or other resinous materials, an asphalt coating 38 is typically provided on high stress areas of the lower surface of seal 30 to prevent deterioration thereof resulting from contact with the active ingredients inside the cell. Although hydrogen can penetrate through the asphalt coating, the entire lower surface of seal 30 is typically not coated in order to allow an optimal amount of hydrogen to escape.

SUMMARY OF THE INVENTION

Accordingly, it is an aspect of the present invention to solve or at least ameliorate the above gassing problem by providing an electrochemical cell having a mechanical structure that not only provides safeguards in the event of excessive gassing, but which also reduces the amount of gas build-up within the cell. It is another aspect of the present invention to provide a cover assembly for an electrochemical cell that blocks external moisture from reaching the interior of the cell. Yet another aspect of the present invention is to provide a cover assembly that not only blocks moisture from reaching the interior of the cell, but also enables internal hydrogen gases to continuously vent and enables all internal gases to vent when the pressure levels in the cell become excessive.

To achieve these and other aspects and advantages, the electrochemical cell of the present invention comprises a can having an open end; electrochemical materials including two electrodes provided within the can; a seal provided in the open end of the can for preventing the electrochemical materials from leaking from the can; and a moisture barrier provided in the open end of the can for preventing external moisture from reaching the seal. Preferably, the moisture barrier includes an inner cover or outer cover having at least one aperture for allowing excessively pressurized gas to escape from the interior of the can. The moisture barrier further preferably includes a moisture-impervious material that cooperates with the inner cover or outer cover to seal the apertures of the inner cover or outer cover and thereby provide a barrier to any external moisture that enters through the apertures in the inner cover or outer cover.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
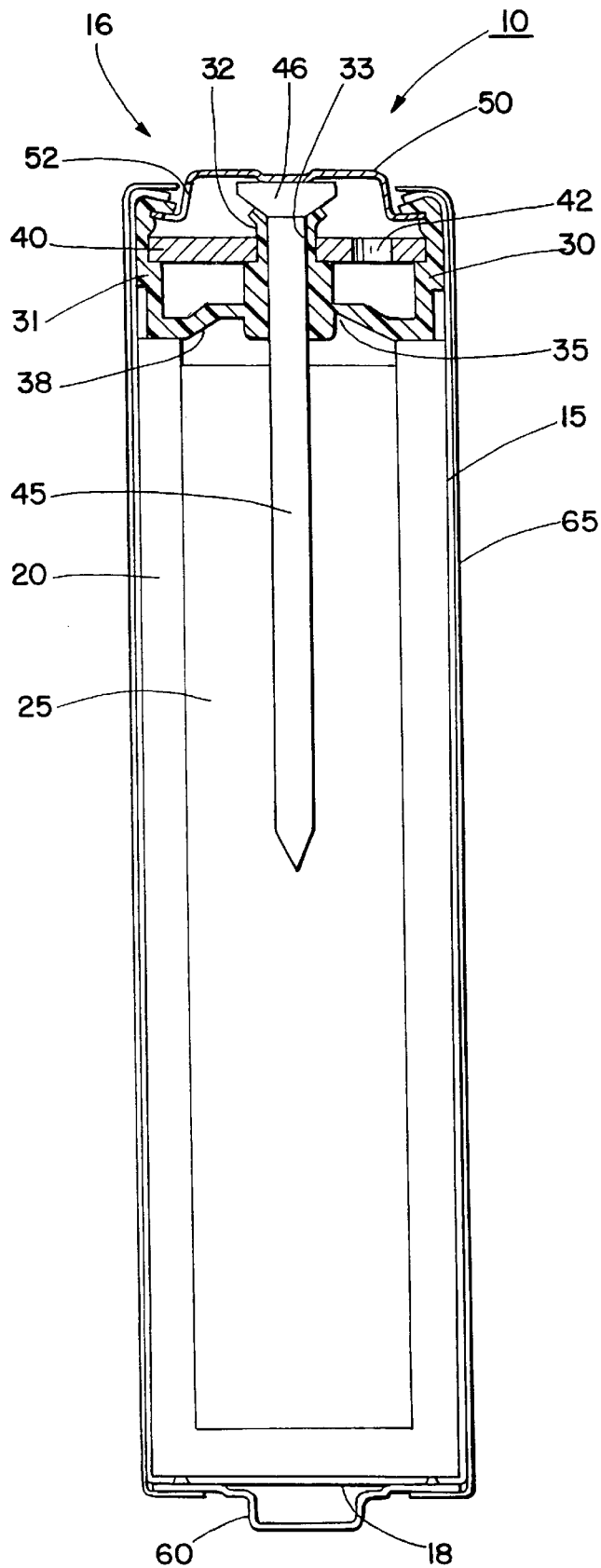
FIG. 1 is a partial cross section of a conventional alkaline electrochemical cell.
Figure 2:
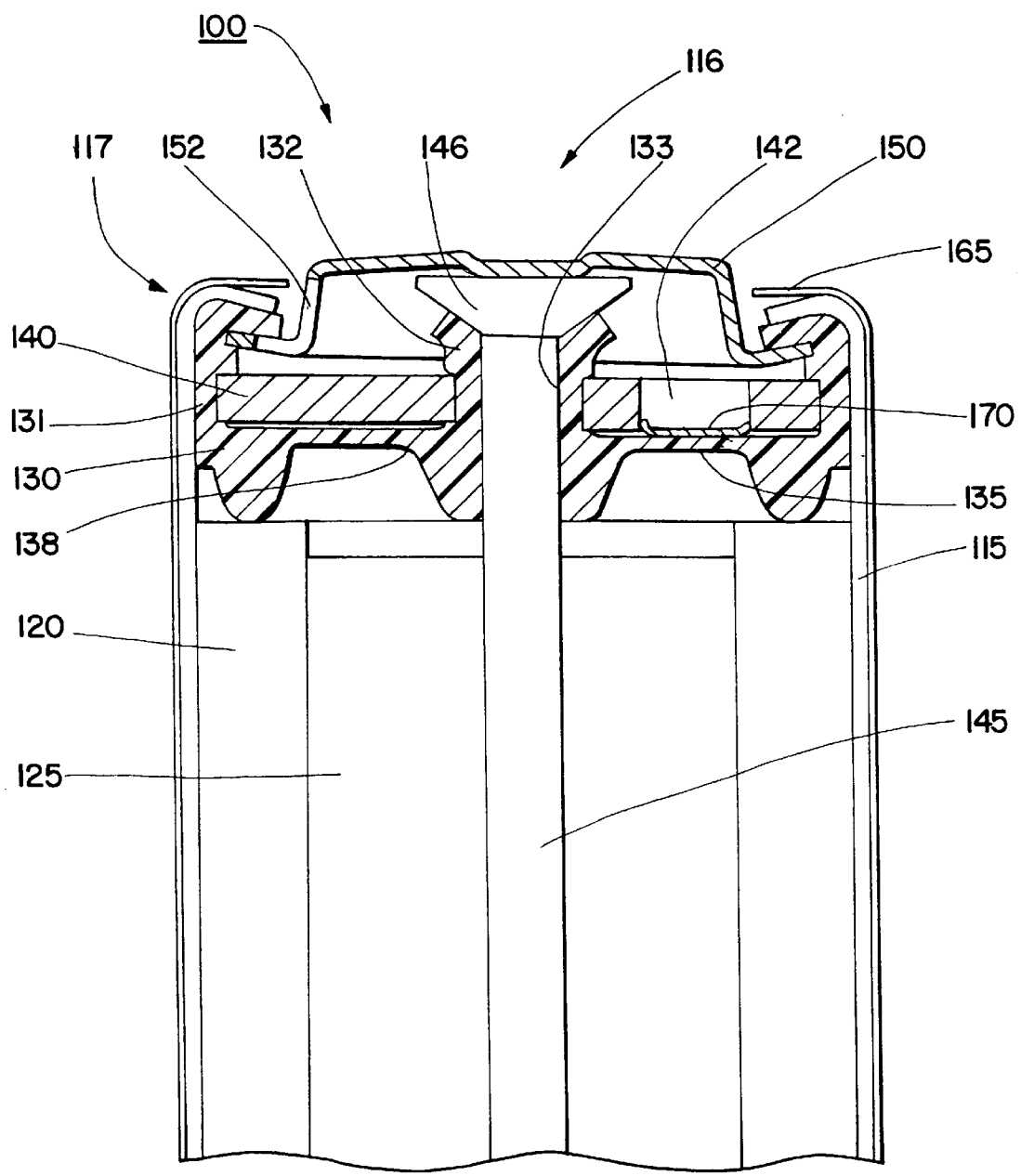
FIG. 2 is an enlarged partial cross-sectional view of an electrochemical cell constructed in accordance with a first embodiment of the present invention.

FIG. 2 shows a partial cross section of an electrochemical cell 100 constructed in accordance with a first embodiment of the present invention. The construction of cell 100 is generally the same as the conventional electrochemical cell with the exception of an improved cover assembly 117. To this end, only the portion of the electrochemical cell pertaining to the improved cover assembly 117 is shown in the drawings.

As shown in FIG. 2, cell 100 includes a can 115 having an open end 116 which is closed and sealed by the cover assembly 117 of the present invention. Prior to sealing, electrochemical materials including a first electrode 120 and a second electrode 125, are provided in can 115. A separator (not shown) is preferably provided between the electrodes in the conventional manner. For an alkaline cell, the first electrode is typically formed of manganese dioxide and the second electrode is formed of zinc.

A seal 130 made of a resinous material, such as nylon, is inserted into open end 116 of can 115. Seal 130 has a unique annular configuration with a central hole 133 provided for receiving a collector nail 145 during assembly. Seal 130 preferably has at least one pressure relief segment 135 which is much thinner than the other portions of seal 130 such that excessive internal cell pressure will cause pressure relief segment 135 to rupture, i.e., tear open, and thus allow internal gases to exit the cell through the apertures and vents described below. A central hub portion 132 of seal 130 in which hole 133 is formed, is preferably much thicker than the thin pressure relief segment 135 so as to provide sufficient sealing around collector nail 145 to prevent leakage of the electrochemical materials therebetween. Similarly, the outer peripheral portion 131 of seal 130 is also much thicker so as to extend a distance along the edge of can 115 and thereby provide sufficient sealing to prevent the electrochemical materials from leaking between seal 130 and the interior surface of can 115.

To provide additional mechanical strength, integrity, and compressive force to the sealing structure, an inner cover 140 preferably made of metal, is inserted between the thicker peripheral and central hub portions 131 and 132, respectively, of seal 130. During assembly, inner cover 140 is snugly seated within an open outwardly-facing portion of seal 130. As depicted in the drawings, inner cover 140 is generally shaped like a disk such that its peripheral edge abuts an inner surface of peripheral portions 131 of seal 130. Further, the thicker central hub portion 132 of seal 130 extends through the centrally-located hole provided in inner cover 140. Consequently, when collector nail 145 is inserted in hole 133 of seal 130, the portions of seal 130 abutting inner cover 140 are significantly compressed. With inner cover 140 firmly in place within seal 130, a layer 170 of material that is impervious to moisture and yet is hydrogen permeable, is disposed on an outwardly-facing surface of seal 130 that is exposed to an aperture 142 provided in inner cover 140. Inner cover 140 preferably includes one or more of such apertures 142 in proximity to the pressure relief segment 135 of seal 130 such that gas in the interior of cell 100 may escape when relief segment 135 tears away due to excessive pressures in the cell. Preferably, the layer 170 of moisture-impervious material is formed of asphalt, which is generally a highly viscous mixture of paraffinic, naphthenic, and aromatic hydrocarbons together with heterocyclic compounds containing sulfur, nitrogen, and oxygen. Another suitable material is a varnish, which is generally an organic protective coating that may be comprised of a vegetable oil and solvent or of a synthetic or natural resin and solvent.

After layer 170 is applied, an outer cover 150 is inserted within the outer-facing opening of seal 130. Outer cover 150 is preferably in electrical contact with the head 146 of collector nail 145 so as to be in electrical contact with second electrode material 125 in the interior of cell 100. Further, cover 150 is electrically insulated from steel can 115 by the peripheral portion 131 of seal 130. In a conventional alkaline cell, outer cover 150 serves as a negative contact terminal for the battery. To allow for escape of vented gases, at least one vent hole 152 is provided in outer cover 150.

After outer cover 150 is positioned in opening 116 of can 115, the upper edges of can 115 are crimped down to secure cover 150 in place. A label 165 is then preferably applied to the outer surface of can 115 in the conventional manner.

As noted above, the inventors of this application have discovered that moisture entering an electrochemical cell through the seal increases the amount of gas build-up within the cell. In particular, the inventors have discovered that in very hot and humid conditions, the humid ambient air reaching the seal results in even more gas build-up within the cell. Although it is not fully understood why this phenomenon occurs, experimentation has shown that by providing an ambient air/moisture barrier of the type shown in FIGS. 2 and 3, the effects of ambient conditions on cell gassing are significantly and unexpectedly reduced. The results of such experimentation are illustrated in Table 1 below.

It is believed that external moisture, which may enter the cell as humid ambient air, may be absorbed by the seal in a conventional cell and thereby reduce the amount of internally-generated hydrogen that can normally escape through the seal. When the hydrogen permeability of the seal is so reduced, hydrogen gas may be generated quicker than it can escape or internally recombine. Another reason why this phenomenon may occur is that the moisture passes through the seal thereby entering the cell interior and somehow affecting the capacity of the electrochemical materials to recombine with the generated hydrogen gas. Regardless of the reason that such external moisture has an adverse impact on gassing, the provision of moisture-impervious layer 170 is effective to reduce gassing.

As shown in Table 1, ten control cells (n=10) were constructed with asphalt applied only to the innermost surface of the seal that is exposed to electrolyte, ten cells were constructed in accordance with the present invention by applying an asphalt layer to both sides of the seal, and ten additional cells were constructed in accordance with the present invention by applying an asphalt layer to the innermost surface of the seal and a varnish-type coating to the outermost side of the seal that is exposed to the external environment. All the cells tested were AAA-size cells, which were maintained continuously in an environment at 60° C. at 90% relative humidity. During the course of this test, the amount of cell bulge was the percentage of the test cells that leaked were monitored. As the test results clearly show, the cells having the outermost surfaces of their seals coated with either a varnish-type coating or an asphalt coating were much less likely to leak due to gassing than the control cells, which did not include any form of moisture barrier between the seal and the vented outer cover assembly.

TABLE 1

| Time @ 60° C./90% RH | Control % of cells leaking | with Asphalt on outermost surface % of cells leaking | with Varnish on outermost surface % of cells leaking |
|---|---|---|---|
| Initial | 0 | 0 | 0 |
| 17 days | 0 | 0 | 0 |
| 28 days | 0 | 0 | 0 |
| 31 days | 10% | 0 | 0 |
| 38 days | 10% | 0 | 0 |
| 42 days | 80% | 0 | 0 |
| 49 days | 80% | 0 | 0 |
| 52 days | 100% | 0 | 0 |
| 56 days | 100% | 0 | 0 |
| 63 days | 100% | 0 | 0 |
| 66 days | 100% | 0 | 20% |
| 70 days | 100% | 0 | 20% |
| 73 days | 100% | 0 | 30% |
| 77 days | 100% | 10% | 30% |
| 83 days | 100% | 10% | 60% |
| 94 days | 100% | 50% | 90% |
| 105 days | 100% | 80% | 90% |

Although conventional cells such as those tested above as the "control cells," include an asphalt coating on the innermost surface of the seal, the fact that moisture or moist ambient air may reach any portion of the outer surface of the seal enables moisture to enter the seal and perhaps the interior of the electrochemical cell due to the porosity of the seal. It should be noted, however, that when regions of the seal are sufficiently compressed by an inner cover, moisture and moist ambient air does not readily penetrate into or through those compressed regions of the seal. Thus, it is not necessary to coat the surfaces of the seal that extend outwardly past the regions of the seal compressed by the inner cover. To the extent, however, that a portion of the seal on the interior side of the inner cover may be exposed to moist ambient air passing through one of the apertures in the inner cover, the entire surface area of the seal that may be exposed to such ambient air should be sealed with an asphalt or varnish-type coating to prevent any such portion of the seal from being exposed to moisture.

Figure 3:
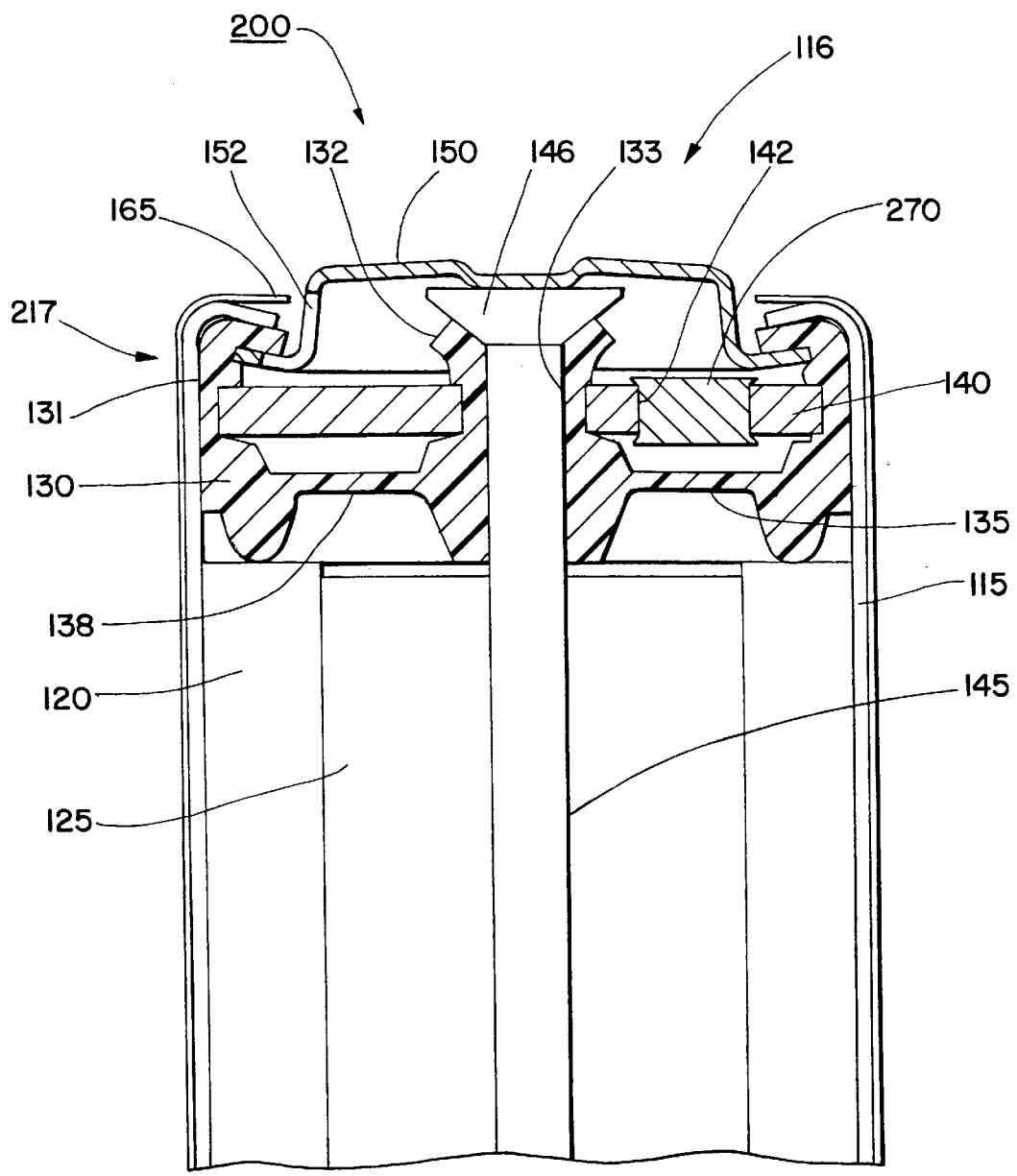
FIG. 3 is an enlarged partial cross-sectional view of an electrochemical cell constructed in accordance with a second embodiment of the present invention.

FIG. 3 shows an electrochemical cell 200 constructed in accordance with a second embodiment of the present invention. Where the cell 200 of the second embodiment includes the same components as that of electrochemical cell 100 of the first embodiment, the same reference numerals are used to designate such components. The configuration according to the second embodiment provides a solution for cover assemblies that have a seal and inner cover that are separated with a significant gap underlying the innermost surface of the inner cover. In this second embodiment, a plug 270 made of a material that is impervious to moisture, such as asphalt or varnish, is provided within the aperture 142 of inner cover 140. In this manner, the compressed regions of seal 130, the inner cover 140, the collector nail 145, and the plug 270 cooperate to provide a moisture barrier between the seal 130 and outer cover 150. Further, although plug 270 provides a barrier to moisture that would otherwise penetrate aperture 142, it does not prevent highly-pressurized gas from within the cell from blowing plug 270 from aperture 142 to escape therethrough and through vent hole 152 in outer cover 150. Further, plug 270 does not prevent small hydrogen atoms within the cell to otherwise continuously escape.

Figure 4:
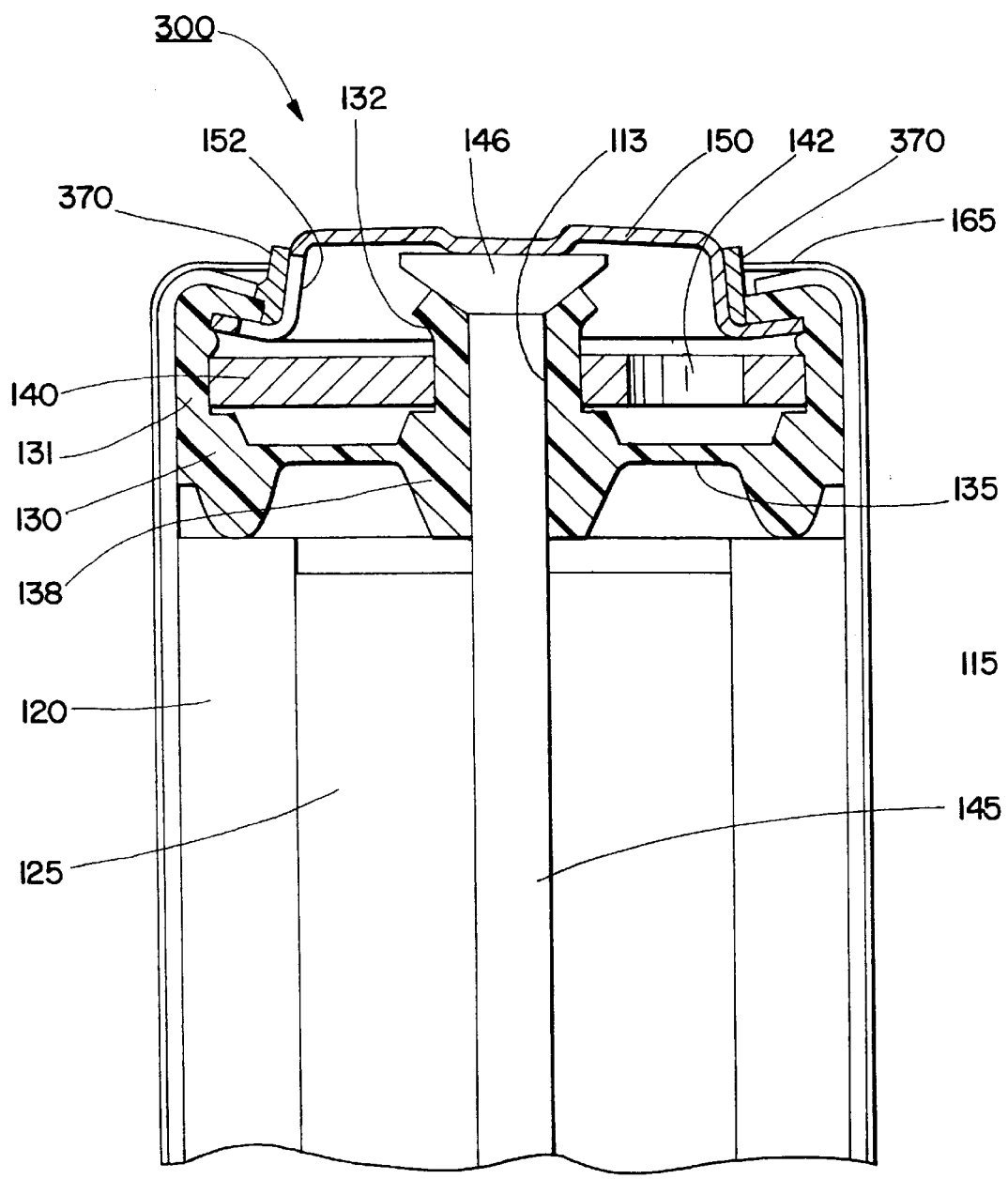
FIG. 4 is an enlarged partial cross-sectional view of an electrochemical cell constructed in accordance with a third embodiment of the present invention.

FIG. 4 shows a cell 300 constructed in accordance with a third embodiment of the present invention. Where cell 300 includes the same components as that of cell 100 and/or cell 200, the same reference numerals are used to designate such components. Cell 300 differs from the other embodiments in that apertures 152 in outer cover 150 are sealed with a moisture-impervious layer 370 that may be provided as a number of plugs or as a continuous layer on the perimeter of the interior or exterior surface of outer cover 150. By providing layer 370 on outer cover 150, a moisture barrier may be provided regardless of whether the cell is constructed with an inner cover.

An alternative construction of the third embodiment would be to extend the plastic label 165 to adhere it to the outer cover 150 such that apertures 152 are sealed from moisture by the label 165.

To protect seal 130 from the electrochemical materials in the interior of cells 100, 200, and 300, portions of the innermost surface of seal 130 are preferably coated with asphalt.

Although the present invention has been described with respect to alkaline cells, it will be appreciated by those skilled in the art that the cover assembly of the present invention may apply to other forms of electrochemical cells, such as non-aqueous cells. Further, it is conceivable that the material provided to block moisture from reaching the seal may be the same or different from that applied to the bottom of the seal to protect it from deterioration.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochemical cell comprising:
   a can having an open end;
   electrochemical materials including two electrodes provided inside said can;
   a seal provided in the open end of said can for preventing leakage of said electrochemical materials from said can; and
   a moisture barrier provided in the open end of said can and spaced apart from said seal for preventing moist ambient air from reaching said seal.

2. The electrochemical cell as defined in claim 1, wherein said moisture barrier includes a pressure relief for venting internally generated gases when pressure inside said can becomes excessive.

3. The electrochemical cell as defined in claim 1, wherein said moisture barrier includes an inner cover having at least one aperture.

4. The electrochemical cell as defined in claim 3, wherein said inner cover has an upper surface and a lower surface such that said aperture extends through said cover from said upper surface to said lower surface said moisture barrier further includes a plug material disposed in contact with said inner cover between said upper and lower surfaces within said aperture for releasably plugging said aperture in said inner cover.

5. The electrochemical cell as defined in claim 4, wherein said plug material is asphalt.

6. The electrochemical cell as defined in claim 1, wherein said moisture barrier includes an outer cover serving as an electrical contact terminal for the cell and having at least one aperture, and a moisture-impervious material sealing the at least one aperture.

7. The electrochemical cell as defined in claim 6, wherein said outer cover serves as a negative contact terminal.

8. The electrochemical cell as defined in claim 1, wherein said electrochemical materials include manganese dioxide and zinc.

9. An electrochemical cell comprising:

a can having an open end;

electrochemical materials including two electrodes provided inside said can;

a seal provided in the open end of said can for preventing leakage of said electrochemical materials from said can;

a vented outer cover provided within and across the open end of said can;

an inner cover having at least one aperture and provided in the open end of said can between said seal and said vented outer cover; and a moisture-impervious material disposed in contact with said inner cover for releasably plugging said aperture in said inner cover and for preventing external moisture from reaching said seal.

10. The electrochemical cell as defined in claim 9, wherein said seal includes a pressure relief for venting internally generated gases when pressure inside said can becomes excessive.

11. The electrochemical cell as defined in claim 9, wherein said moisture-impervious material is asphalt.

12. The electrochemical cell as defined in claim 9, wherein said moisture-impervious material includes varnish.

13. An electrochemical cell comprising:

a can having an open end;

electrochemical materials including two electrodes provided inside said can;

a seal provided in the open end of said can for preventing leakage of said electrochemical materials from said can;

a vented outer cover provided within and across the open end of said can;

a metal inner cover having at least one aperture and provided in the open end of said can between said seal and said vented outer cover, wherein an inner surface of said metal inner cover is disposed in close proximity to an outer surface of said seal; and a layer of moisture-impervious material disposed on the outer surface of said seal in an area underlying said aperture so as to prevent external moisture from reaching non-compressed regions of said seal.

14. The electrochemical cell as defined in claim 13, wherein said moisture-impervious material is asphalt.

15. The electrochemical cell as defined in claim 13, wherein said moisture-impervious material includes varnish.

16. An electrochemical cell comprising:

a can having an open end;

electrochemical materials including two electrodes provided inside said can;

an outer cover provided within and across the open end of said can and being electrically coupled to one of said electrodes, said outer cover having at least one aperture; and a moisture-impervious material disposed across said aperture to prevent external moisture from entering said can through said aperture.

17. The electrochemical cell as defined in claim 16 and further including a seal provided in the open end of said can for preventing leakage of said electrochemical materials from said can, wherein said outer cover and said moisture-impervious material cooperate to prevent moisture from reaching said seal.

18. The electrochemical cell as defined in claim 16, wherein said outer cover serves as a negative contact terminal.

19. The electrochemical cell as defined in claim 16, wherein said moisture-impervious material is asphalt.

20. The electrochemical cell as defined in claim 17, wherein said moisture-impervious material includes varnish.

21. The electrochemical cell as defined in claim 9, wherein said inner cover has an outer surface and an inner surface and has at least one aperture extending through said inner cover from said outer surface to said inner surface, and wherein said moisture-impervious material is disposed within said aperture between said outer and inner surfaces.

22. The electrochemical cell as defined in claim 13, wherein said seal includes an integral pressure relief mechanism for venting internally generated gases when pressure inside said can becomes excessive.

23. The electrochemical cell as defined in claim 13 wherein said outer cover is electrically coupled to one of said electrodes.

24. The electrochemical cell as defined in claim 13, wherein said outer cover serves as a negative contact terminal.

25. The electrochemical cell as defined in claim 13, wherein said inner cover having an outer surface such that said aperture extends through said inner cover from said inner surface to said outer surface and said layer of moisture-impervious material is disposed within said aperture between said inner and outer surfaces so as to prevent external moisture from reaching non-compressed regions of said seal.

26. The electrochemical cell as defined in claim 16 and further including an inner cover provided in the open end of said can between said seal and said outer cover.

* * * * *